Nov. 17, 1970   F. M. WOOD   3,540,267
ULTRASONIC TESTING OF DRILL PIPE AND THE LIKE
Filed Oct. 18, 1967   2 Sheets-Sheet 1

Fenton M. Wood
INVENTOR

BY Arnold, Roylance,
Kruger & Durkee
ATTORNEYS

Fenton M. Wood
INVENTOR

BY Arnold, Roylance, Kruger & Durkee
ATTORNEYS

United States Patent Office 3,540,267
Patented Nov. 17, 1970

3,540,267
ULTRASONIC TESTING OF DRILL PIPE AND THE LIKE
Fenton M. Wood, Sugarland, Tex., assignor to American Machine & Foundry, New York, N.Y., a corporation of New Jersey
Filed Oct. 18, 1967, Ser. No. 676,146
Int. Cl. G01n 29/04
U.S. Cl. 73—67.8                                    8 Claims

ABSTRACT OF THE DISCLOSURE

A bending moment is applied to a rotating length of drill pipe at the portion under investigation for cracks and the like, whereby the abutting faces of the crack are alternately spread apart and urged tightly together. Ultrasonic transducers are located at the two points of maximum tension and compression to provide a comparison measurement to distinguish actual flaws from non-injurious anomalies.

BACKGROUND OF THE INVENTION

This invention relates to methods and apparatus for determining the presence and location of anomalies in metal conduit, and more particularly relates to methods and apparatus for locating flaws or other defects in weld joints of drill pipe or the like.

It is well known that most oil and gas wells are drilled with a drill bit which is suspended at the lower end of a rotating string or tandem assembly of lengths of steel casing or pipe. Each length or "joint" of drill pipe is usually provided with an externally-threaded fitting or "pin" welded to one end, and an internally-threaded fitting or "box" welded to the other end, by which the various joints of pipe may be interconnected to make up the string of drill pipe. Since the drill string may be thousands of feet long, it will be apparent that each of the aforementioned welds is necessarily subjected to considerable stress. It will also be apparent that, if a particular weld contains a defect of some type, the weld may fail under the stress and it may become necessary to fish the severed portion of the drill string out of the borehole.

Since it is difficult as well as costly to retrieve several thousand feet of drill pipe from a deep borehole, it is extremely desirable to carefully inspect each weld in each joint of pipe before coupling into the drill string to be inserted into the borehole. Unfortunately, however, many weld defects are invisible to the naked eye, and thus various investigating techniques and devices have been developed for the purpose of locating weld defects which might otherwise not be apparent to even the most searching of visual inspections. Examples of such techniques and apparatus may be found in the following listed U.S. patents: Nos. 2,011,441, 2,433,963, 2,461,543, 2,534,006, 2,545,309, 2,618,968, 2,657,573, 2,761,310, 2,937,522, 3,029,381, 3,083,566, 3,121,324, 3,188,860.

In addition to the techniques described in the aforementioned patents, ultrasonic methods and apparatus have been used to detect cracks and similar flaws in the wall of pipe such as that used in oil and gas pipelines. For example, an ultrasonic transducer such as a magnetostrictive assembly or a piezoelectric crystal is disposed adjacent the crack to transmit continuous or pulsed oscillations at ultrasonic frequencies into the wall of the pipe. It is well known that the energy waves traveling in the pipe tend to reflect off of interfaces such as the abutting surfaces of a crack, and these reflected waves may be received by the transducer and measured as an indication of a flaw.

Although various forms of the foregoing ultrasonic technique have been used successfully to inspect pipe and the like, it is the case that ultrasonic energy tends to traverse two abutting interfaces which are urged tightly together. Accordingly, many cracks and other like flaws such as lack of fusion in welds often tend to be invisible to all but the most searching of ultrasonic inspections, especially when the abutting surfaces are smooth.

These disadvantages of the prior art are overcome with the present invention, and novel methods and apparatus are provided herein for detecting flaws and other defects in the wall of drill pipe and the like.

PREFERRED FORM OF THE INVENTION

In a preferred form of the present invention, wherein flaws such as lack of fusion are sought to be detected in the weld between a length or joint of drill pipe and its pin or box, the pipe is subjected to a bending moment while it is rotated about its longitudinal axis. Thus, as each section or portion of the weld revolves through 180 degrees of rotation, each portion of the weld is alternately subjected to tension and compression.

In addition to bending and rotating the drill pipe, a pair of ultrasonic transducers are disposed adjacent the weld but spaced 180 degrees about the pipe from each other, so that one transducer is disposed at the portion of the weld which is subjected to maximum tension by the bending moment, while the other transducer is disposed adjacent the portion of the weld which is simultaneously subjected to maximum compression. Circuitry is also preferably included to correlate the signals from the two transduecrs, whereby a comparison may be had of each portion of the weld under conditions of both tension and compression.

Accordingly, it will be apparent that as the pipe is revolved 180 degrees, any region in the weld wherein lack of fusion exists will be subjected to alternate conditions of maximum tension and compression. Thus, the abutting surfaces of a crack or region of lack of fusion will tend to be spread apart when the flaw is rotated past one transducer, and will tend to be urged tightly together as the flaw is thereafter rotated past the other transducer. Not only will the tension tend to provide a more emphatic indication of the presence of a crack or the like, the comparison of that indication with a measurement of the crack under compression tends to provide a basis for distinguishing actual flaws from certain types of non-injurious anomalies which are often present and which often appear as flaws to detection techniques of the prior art.

OBJECTS

Accordingly, it is an object of the present invention to provide novel methods and apparatus for detecting flaws in drill pipe and the like.

It is also an object of the present invention to provide novel methods and apparatus for applying tension to a length of drill pipe and the like to detect flaws and defects therein.

It is a further object of the present invention to provide novel methods and apparatus for subjecting a portion of a length of drill pipe and the like alternately to tension and compression while detecting flaws in said portion.

These and other objects and features of the present invention will become apparent from the following detailed description, wherein reference is made to the figures in the accompanying drawings.

DRAWINGS

In the drawings:

FIG. 1 is a functional and pictorial representation, partly in cross section, of an illustrative embodiment of an apparatus for detecting lack of fusion in a weld at one end of a drill pipe or the like.

FIG. 2 is a functional and pictorial representation of another illustrative embodiment of apparatus for detecting lack of fusion in welds in two connected lengths or joints of drill pipe or the like.

DETAILED DESCRIPTION

Figure 1:
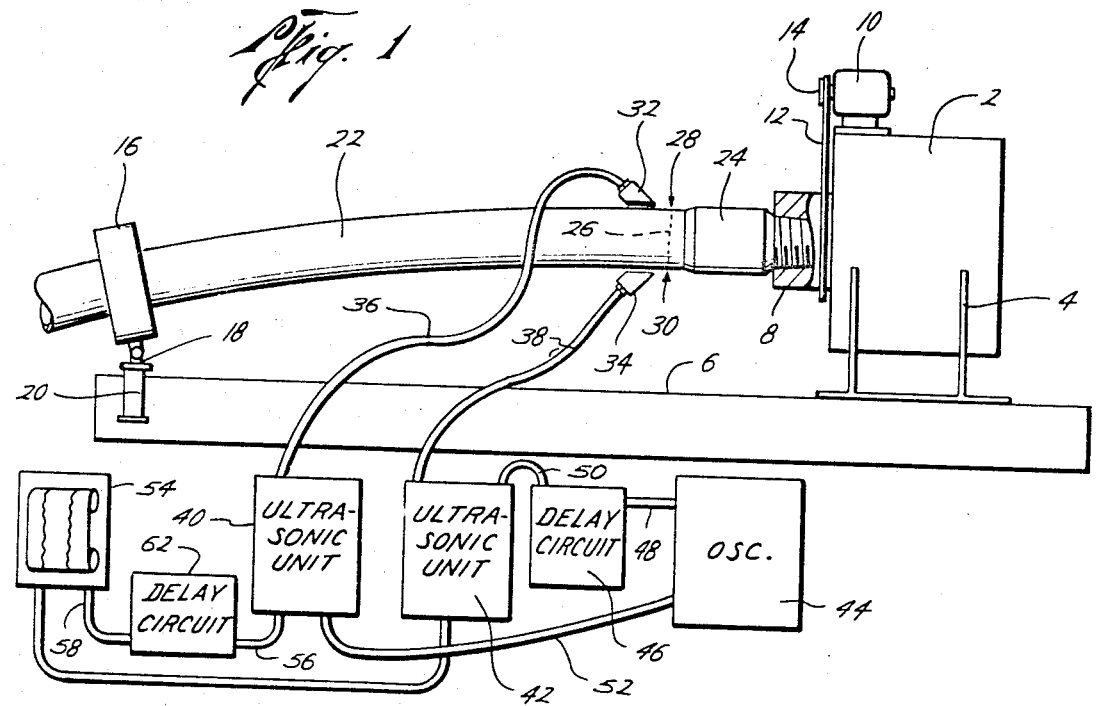

Referring now to FIG. 1. there may be seen an illustrative embodiment of apparatus for detecting flaws such as lack of fusion in a weld in a length or joint of drill pipe and the like. In particular, there may be seen a headstock 2 mounted on support brackets 4 which are rigidly fixed to a base 6 or other suitable platform. The headstock 2 may be of any conventional design, and thus may contain a bearing and support (not depicted) for a rotatable chuck 8 which is coupled to an electric motor 10 or other suitable driving means by an endless sprocket chain 12 or belt. Alternatively, the drive shaft 14 of the motor 10 may be connected by any suitable means to the chuck 8, such as by gears.

As may also be seen, the headstock 2 is preferably located at one end of the base 6, with the mouth of the chuck 8 directed towards the other end of the base 6. A suitable anchor 16, such as a ring or strap, is preferably disposed at the other end of the base 6 from the headstock 2 in general axial alignment with the chuck 8, and is preferably linked to and supported by a vertically movable piston 18 in a pneumatic cylinder 20.

As may further be seen, the apparatus illustrated in FIG. 1 is designed to accommodate a single length or joint of drill pipe 22, or the like, having a pin 24 connected to one end by a weld 26. More particularly, the drill pipe 22 is slidably inserted through the anchor 16 so that the pin 24 may be threadedly engaged with the chuck 8 or other gripping device which is rotatably supported by the headstock 2. In operation, the piston 18 is thereafter driven downward in the cylinder 20 to apply a bending moment to the pipe 22, while the chuck 8 is rotated by the motor 10. Since the pipe 22 is slidably disposed in the anchor 16, the pipe 22 will be held in its bent condition even though being rotated about its longitudinal axis, so as to apply a tension generally across the upper 180 degrees of the weld 26, and to simultaneously apply a compression generally across the lower 180 degree of the weld 26. It will also be apparent that the maximum tension will be applied at the top area 28 of the weld 26, while the maximum compressional force will be simultaneously applied to the bottom area 30 of the weld 26, during rotation of the pipe 22.

Also depicted in FIG. 1, is means for detecting lack of fusion and other defects in the weld 26, which means may be seen to include an upper transducer assembly 32 located adjacent the top area 28 of the weld 26, and a lower transducer assembly 34 located adjacent the bottom area 30 of the weld 26. Any suitable supporting device may be used to position the transducer assemblies 32 and 34 in this manner. However, it should be clearly understood that the transducer assemblies 32 and 34 do not rotate with the pipe 22, but instead are maintained in their respective top and bottom positions relative to the pipe 22 as depicted in FIG. 1.

As may also be seen, the upper transducer assembly 32 is connected by means of a suitable cable 36 to a conventional pulse echo ultrasonic unit 40 of the type shown in FIG. 1 of U.S. Pat. 3,226,976, for example. The unit 40 includes suitable circuitry for processing the ultrasonic signals to be generated in the pipe 22 by the upper transducer assembly 32, and measuring and processing circuitry for processing and measuring signals received by the upper transducer assembly 32 from the top 28 of the weld 26. Similarly, the lower transducer assembly 34 is connected by another cable 38 to another ultrasonic unit 42 for processing and measuring signals passing between the lower transducer assembly 34 and the bottom 30 of the weld 26.

The ultrasonic units 40 and 42 may be seen to be connected by cables 48, 50 and 52 to an oscillator 44 which generates the signal from which are derived the ultrasonic signals produced by the transducer assemblies 32 and 34. As hereinbefore stated, however, it is an object of the present invention to provide means and method for examining each portion of the weld 26 under conditions of both tension and compression. Thus, the output signals generated by the oscillator 44 are passed to the second ultrasonic unit 42 by way of a delay circuit 46, which may be of conventional design, and which operates to delay the output from the oscillator 44 a time interval corresponding to the time required for all of the reverberations from the pulse from the opposite transducer 32 to die away before pulsing the transducer 34 to avoid confusion of signals. This delay may be about ½ to 1 millisecond, for example. If the pipe being tested is quite large, the delay circuit 46 may not be needed because of attenuation in the pipe itself.

Each of the two ultrasonic units 40 and 42 may be provided with separate indicating devices for indicating the presence of lack of fusion and other flaws by indicating the attenuation of the ultrasonic energy in the pipe 22. It is preferable, however, that the indications from the top 28 and bottom 30 of the weld 26 be correlatively provided in a manner to facilitate comparison. Accordingly, a single recording indicator 54 may be connected to both ultrasonic units 40 and 42 by means of cables 56, 58 and 60, for the purpose of correlatively indicating the magnitude of such indication from each portion of the weld 26 under conditions of both tension and compression. Inasmuch as the signals produced by the first ultrasonic unit 40 will be 180 degrees out of time from the signals produced by the second ultrasonic unit 42, it is preferable that the output from the first ultrasonic unit 40 be passed to the recording indicator 54 by way of a suitable delay circuit 62 which delays these signals a time interval equal to the time for the pipe 22 to be revolved through one-half revolution, a period much longer than that of the other delay circuit 46.

Figure 2:
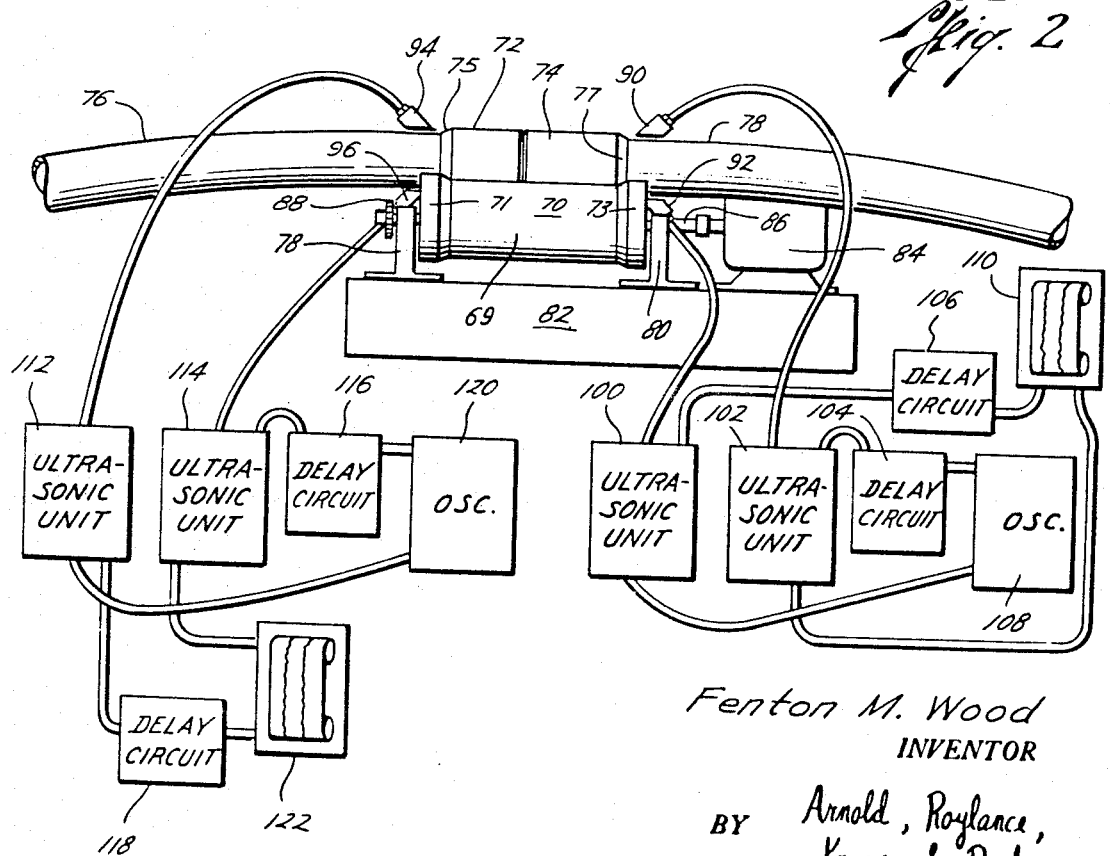

Referring now to FIG. 2, there is depicted a different form of apparatus, which is exemplary of the present invention, and which is suitable for detecting flaws such as lack of fusion in two welds at substantially the same time. In this embodiment, there may be seen a pair of closely-aligned rollers 70 (only one depicted) which are adapted to support the coupled pin 72 and box 74 of two lengths or joints of drill pipe 76 and 78 or the like. In this instance, the two joints of pipe 76 and 78 may be seen to be arranged so that the welds adjacent the pin 72 and box 74, respectively, are subjected to tension and compression, as hereinbefore explained, by the fact that the opposite ends o the pipe 76 and 78 are unsupported. Thus, the rollers 70 may be revolved to rotate both lengths of pipe 76 and 78 in a bent condition without the necessity of the anchor 16 depicted in FIG. 1.

As represented in FIG. 2, the rollers 70 are mounted on brackets 78 and 80 which, in turn, may be fixed to a suitable platform or base 82. An electric motor 84 or other suitable driving means is connected to one end of the axis or shaft 86 of one of the rollers 70. The other end of the shaft 86 may be coupled by any suitable means such as a sprocket chain 88 to the adjacent end of the shaft (not depicted) of the other roller. Accordingly, rotation of one of the rollers 70 by the motor 84 will produce a corresponding rotation of the other of the two rollers 70 in the same direction. Assuming that both rollers 70 are approximately the same size, this will produce a corresponding revolvement of the connected drill pipes 76 and 78 in the opposite direction while they are each held in a bent condition by their respective weight and length.

As may also be seen in FIG. 2, there may be provided upper and lower transducer assemblies 90 and 92 adjacent the top and bottom portions of the weld connecting the box 74 to the drill pipe 78. Similarly, upper and lower transducer assemblies 94 and 96 may be disposed adjacent the weld connecting the pin 72 to the drill pipe 76. Ultrasonic units 100 and 102, delay circuits 104 and 106, an oscillator 108, and a recording indicator 110, may be connected to process and record the signals passing between the two transducer assemblies 90 and 92 and the weld adjacent the box 74, as hereinbefore explained with respect to the apparatus depicted in FIG. 1. Similarly, ultrasonic units 112 and 114, delay circuits 116 and 118, and an oscillator 120 and a recording indicator 122, may be interconnected with the transducer assemblies 94 and 96 located adjacent the weld coupling the pin 72 to the drill pipe 76.

It will be apparent that the two lengths of drill pipe 76 and 78 will tend to whiplash as they are rotated by the rollers 70. In order to maintain them in position during rotation, it will be noted that the roller surfaces of the rollers 70 may be shaped to conform to and accommodate the pin 72 and box 74 depicted in FIG. 2. In other words, it may be seen that the outside diameters of the major portion of both the pin 72 and the box 74 are substantially larger than the outside diameter of the two lengths of drill pipe 76 and 78, and that sloping or beveled surfaces 75 and 77 are provided to connect the cylindrical external surface of the pin 72 to the drill pipe 76, and to similarly connect the cylindrical external surface of the box 74 to the drill pipe 78.

Accordingly, it may be provided both of the rollers 70 shall each have a center section 69 corresponding in length to the combined length of the cylindrical and threaded portions of the pin 72 and box 74 when these two components are joined, and that each roller 70 have enlarged end sections 71 and 73 which are beveled and shaped to fit against and accommodate the beveled surfaces 75 and 77 of the pin 72 and box 74 and the external surfaces of pipes 76 and 78 adjacent thereto.

It will be apparent that the weight of the coupled lengths of drill pipe 76 and 78 will prevent them from riding laterally off of the roller assembly 70, notwithstanding their tendency to whiplash during rotation. However, there will be a tendency for the coupled lengths of pipe 76 and 78 to ride longitudinally along the rollers 70. The enlarged ends 71 and 73 of the rollers 70 will prevent this, and accordingly will hold the welds in position relative to the transducer assemblies 90, 92, 94 and 96.

Although two oscillators 108 and 120 have been depicted in FIG. 2, it will be readily apparent that the output of oscillator 108, for example, may be interconnected with the transducer assemblies 94 and 96 as well as the transducer assemblies 90 and 92. Similarly, recording indicator 110, for example, may be provided with four input channels and may be connected to receive signals from ultrasonic units 112 and 114 as well as from ultrasonic units 100 and 102.

Although the foregoing description of the present invention has been directed primarily to detecting lack of fusion defects in welds, it will be apparent that the apparatus and methods of the present invention will also be useful in detecting other types of flaws in welds. Moreover, the aforementioned transducer assemblies need not be positioned only adjacent the welds but may be used to survey the entire length of each joint of drill pipe.

Figure 3:
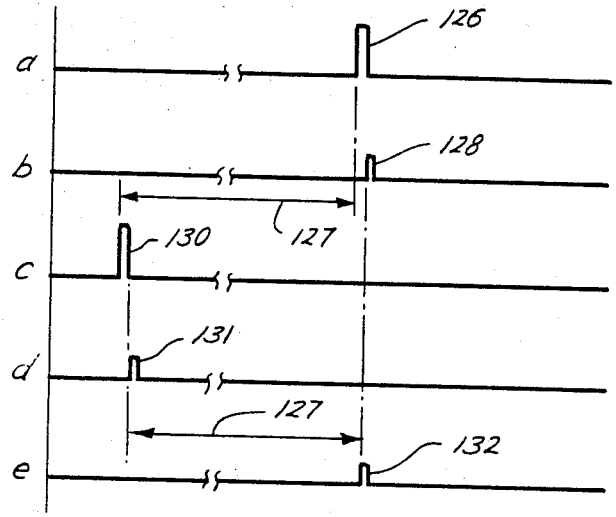
FIGS. 3 and 4 are graphic representations of waveforms or signals appearing in the apparatus of FIGS. 1 and 2.

With reference now to FIG. 3 of the drawing, waveforms illustrating electrical signals at various points in the systems of either FIG. 1 or FIG. 2 are illustrated. In FIG. 3a, a pulse 126 is shown which represents an impulse of ultrasonic energy as would be produced by the oscillator 44, or of course by the oscillators 108 or 120, the systems of FIGS. 1 and 2 being the same in this regard. The pulse 126 may be a single spike of short duration, or may be a short burst of oscillations at a given ultrasonic frequency. This impulse 126, applied by the line 48 to the delay circuit 46, results in a similar impulse being applied to the transducer, the short delay introduced by the circuit 46 being ignored.

The pulse 126 is applied by the line 50 to the ultrasonic unit 42 which functions to couple the pulse through the line 38 to the transducer 34. Reflection from the weld 26 in the pipeline as received by the transducer 34 may be depicted as a pulse 128 as seen in FIG. 3b. This pulse is delayed with respect to the pulse 126 by an amount which is small compared to the time between pulses. The pulse 128 is applied to the ultrasonic unit 42 which functions to separate the reflected impulses from the transmitted power pulses, to remove unwanted reverberations, to amplify and detect the pulses, etc. It is therefore only the pulse 128 which is applied from the output of the ultrasonic unit 42 to the recorder 54.

Considering now the other channel, it will be noted that a pulse 130 as seen in FIG. 3c will have been applied to the transducer 32 one-half revolution prior to the occurrence of the pulse 126, a period 127 representing 180° being depicted. The pulse 130 is applied from the oscillator 44 through the line 52 and the ultrasonic unit 40 to the line 36 and thus to the transducer 32. The pulse 130 is exactly like the pulse 126, but is applied to the transducer earlier by a 180° period. A reflected pulse 131 from the circumferential weld is seen in FIG. 3d, this pulse being detected by the transducer 32 and applied through the ultrasonic unit to the output line 56 and thus to the delay circuit 62. The delay circuit 62 introduces a delay of an interval 127 as seen in FIG. 3e, this being the same time period mentioned above for one-half revolution. The signal applied by the line 58 to the recorder 54 for this channel will thus be a pulse 132 which will coincide in time with the pulse 128 on the strip chart recording. Since the pipe 22 would typically be rotated at perhaps 300–400 r.p.m., the delay interval 127 for 180° would be about one-tenth second, this being within the range of state of the art equipment, and so any of a number of commercially available ultrasonic delay devices could be used as the delay unit 62.

It should be noted that although only one set of pulses is shown in FIG. 3, the pulses 126 and 130 occur at rather close time intervals, many of these being interposed in the time period required for the pipe to make one-half revolution. Each of the pulses 126 or 130 functions, in effect, to inspect a small segment of the circumferential weld, perhaps a few minutes of arc. Therefore, many of these pulses would be required to completely inspect the entire 360°, and so for the 300 r.p.m. example noted above the repetition rate for the pulses 126 or 130 would be several thousand pulses per second. Thus hundreds of the pulses 126 would occur in the time period 127 before the corresponding pulse 130 occurs. It is noted that the pulses produced at the output of the oscillator 44 are at regular intervals, but need not be synchronized with rotation of the pipe because the close spacing between pulses renders any offsetting of the time of occurrence of the pulses below the level of revolution.

Figure 4:
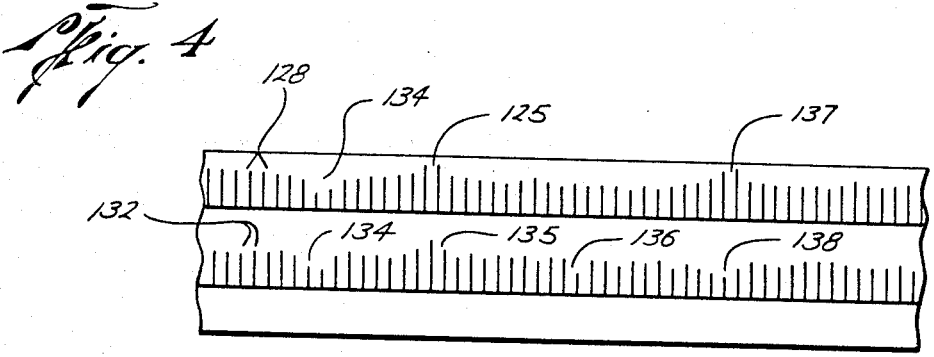

Turning now to FIG. 4, an exemplary segment of the strip chart recording produced by the recorder 54 is illustrated. The strip chart will include two series of recorded pulse trains, one being the pulses 128 corresponding to reflections from successive small segments of the circumferential weld as it is placed in maximum compression due to the weight of or bending moment on the pipe. The other series will be the pulses 132 corresponding to the same segments as they are placed in tension as they reach the top of the pipe at the location of the transducer 32. For a given segment of the circumferential weld, its reflected pulse 128 will be aligned with or in time coincidence with its corresponding pulse 132 due to the functions of the delay circuits. Thus, even though inspection of the segment in tension occurred at a different time than inspection under compression, the resultant pulses will be aligned on the record.

It may be noted in FIG. 4 that various anomalies or departures in the magnitude of reflected energy will produce dips 134 or peaks 135 in the record. So long as these occur together, i.e., indicating the same reflective character regardless of whether in tension or compression, the weld is not defective. However, if one trace shows a dip 136 while the other remains constant, or one shows a peak 137 and the other a dip 138, then a portion of the weld is not solid in that it spreads apart or becomes less dense under tension and compacts under compression. This indicates a so-called "paste" weld, and the joint under test should be rejected as defective.

What is claimed is:

1. A method of inspecting a circumferential weld in a pipe or the like comprising the steps of:
   coupling ultrasonic impulses into the pipe in the vicinity of the weld at diametrically spaced positions;
   detecting and recording characteristics of reflections of the ultrasonic impulses from the weld for the diametrically spaced positions;
   while subjecting the pipe to a bending moment whereby the diametrically spaced positions of the weld are in tension and compression, respectively.

2. A method according to claim 1 including the step of rotating the pipe about its axis while performing the coupling and detecting steps.

3. A method according to claim 2 wherein the step of detecting reflections of the ultrasonic impulses includes the step of delaying impulses from one of said positions by a given time period corresponding to that required for the pipe to be rotated about 180°.

4. A method for inspecting an object comprising the steps of:
   coupling impulses of energy into a region of the object while applying stress of one character to said region and detecting reflections of said impulses in the vicinity of said region,
   thereafter coupling impulses of energy into said region of the object while subjecting said region to stress of a different character and detecting the reflections of said second-named impulses in the vicinity of said region,
   recording reflections of the first-named and second-named impulses on respective records and delaying one of the reflections of impulses to establish time coincidence between the two records to facilitate correlation of the characteristics of said region under said stresses of differing character.

5. The method of claim 4 wherein the object is a pipe and including the steps of:
   supporting said pipe adjacent one end thereof, and
   rotating said pipe about its axis, thereby subjecting said pipe to a bending moment.

6. Apparatus for inspecting a pipe comprising:
   means for supporting said pipe adjacent one end thereof whereby said pipe is subject to a bending moment about said one end,
   means for rotating said pipe about its axis, whereby a given portion of said pipe alternately is in tension and compression as the pipe rotates,
   first and second ultrasonic transducers disposed at diametrically spaced positions adjacent said pipe for directing pulses of ultrasonic energy into the pipe and for receiving reflections of ultrasonic pulses from said pipe, and
   means for recording the characteristics of reflected pulses received by said transducers.

7. The apparatus claimed in claim 6 and further including,
   means for providing separate records of the reflections of ultrasonic pulses received by the respective transducers, and
   means for delaying the recording of pulses from one of said transducers by a time required for the pipe to rotate 180°, whereby reflections from the two transducers received from a given portion of the pipe are recorded in time coincidence on the respective records.

8. The apparatus claimed in claim 6 and further including means engaging the other end of said pipe to further impart a bending moment to said pipe about said one end.

References Cited

UNITED STATES PATENTS 3,436,958    4/1969    Proctor _____ 73—67.6

OTHER REFERENCES

Lawrie, W. E., Wadd Technical Report 61–91, April 1961, pp. 29–32.

RICHARD C. QUEISSER, Primary Examiner

J. P. BEAUCHAMP, Assistant Examiner